United States Patent [19]

Davenport et al.

[11] Patent Number: 4,668,941

[45] Date of Patent: May 26, 1987

[54] METHOD AND APPARATUS FOR DISCRIMINATING SOUNDS DUE TO THE BREAKAGE OR GLASS

[75] Inventors: Raymond J. Davenport, Potton; Michael A. Tomlinson, Newport Pagnell, both of England

[73] Assignee: Automated Security (Holdings) Ltd., London, England

[21] Appl. No.: 823,993

[22] Filed: Jan. 29, 1986

[30] Foreign Application Priority Data

Feb. 8, 1985 [GB] United Kingdom ............... 8503204

[51] Int. Cl.⁴ ........................................... G08B 13/04
[52] U.S. Cl. ................................... 340/550; 340/566
[58] Field of Search ............................... 340/550, 566

[56] References Cited

U.S. PATENT DOCUMENTS

| | | | |
|---|---|---|---|
| 4,091,660 | 5/1978 | Yanagi | 340/550 |
| 4,134,109 | 1/1979 | McCormick et al. | 340/550 |
| 4,196,423 | 4/1980 | Carver et al. | 340/550 |
| 4,307,387 | 12/1981 | Baxendale | 340/550 |

Primary Examiner—Glen R. Swann, III
Attorney, Agent, or Firm—Woodard, Weikart, Emhardt & Naughton

[57] ABSTRACT

The sound of breaking glass comprises a low frequency or thump sound at the moment of breakage, followed by a tinkle sound caused by collision of the glass fragments, this sound being of lower amplitude.

The invention turns on the discovery that, irrespective of the size and shape of the glass and the characteristics of the surroundings, the thump has substantial low frequency components at about 350 Hz, and the tinkle has substantial high frequency components at about 6.5 KHz. The method of the invention lies in identifying the high and low frequency components in that order and separated by a short time interval.

Apparatus according to the invention comprises a microphonefeeding into a high frequency and a low frequency channel. The low frequency channel has a bandpass filter centered on 350 Hz, the output of which triggers a time delay establishing a time window during which a signal is applied to one input of an AND gate. The high frequency channel includes a bandpass filter centered on 6.5 KHz, an output from which is applied to the other input of the AND gate. An output from the AND gate indicates that a signal characteristic of breaking glass has been detected and this output may be applied to trigger alarm circuits.

A suitable bandwidth for the high frequency bandpass filter is ±2 KHz and a suitable delay between the detection of the thump signal and the commencement of the time window is 200 milliseconds.

7 Claims, 6 Drawing Figures

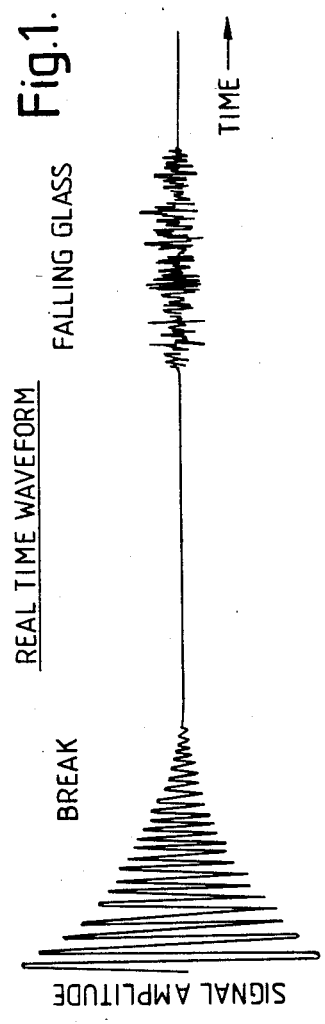
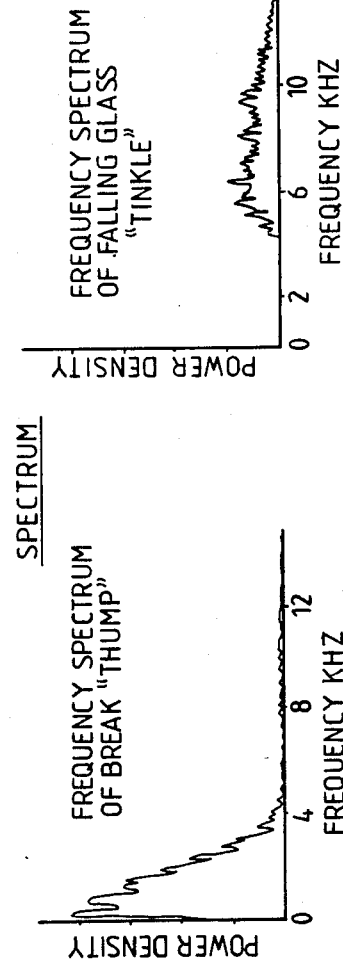
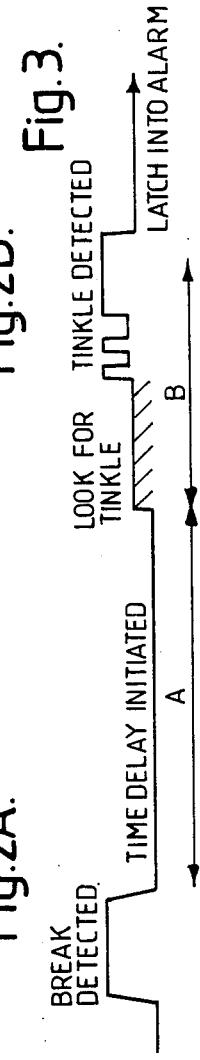

METHOD AND APPARATUS FOR DISCRIMINATING SOUNDS DUE TO THE BREAKAGE OR GLASS

BACKGROUND OF THE INVENTION

This invention relates to a method and an apparatus for detecting sounds due to the breakage of glass.

Although the sound of breaking glass is usually readily identifiable to the human ear, the physical make-up of the sound depends on such matters as the thickness and area of the glass, the manner in which it is mounted, the height above floor level and the acoustic properties of the enclosure in which the breakage takes place. These factors make the identification of the sound from its physical characteristics, difficult and uncertain.

Conventional glass break detectors respond to frequencies above say, 4.5 KHz and are liable to produce false alarms upon detection of other sounds occurring in the frequency range of interest, for example telephone bells and rattling keys.

In an attempt to reduce the occurrence of false alarms much fine tuning of the detector is necessary once it has been installed on site.

It is known that the sound of breaking glass comprises an initial low frequency sound of fairly large amplitude followed by higher frequency sound as the fragments of glass collide with one another and with the floor. U.S. Pat. No. 4,134,109 for example, proposes analysing the pattern of acoustic signals in terms of signal strength of the initial sound and frequency content of subsequent sounds to discriminate between the breaking of glass and other sounds. If the amplitude of the initial sounds exceeds a given threshold and the frequency content of the later sound fits a predetermined pattern, an alarm signal is produced.

The system of U.S. Pat. No. 4,134,109 includes a complicated signal analysis circuit which is costly. Another disadvantage is the inability to discriminate between repeated large amplitude sounds containing high frequency components. It can be triggered by any sufficiently loud sound irrespective of its frequency.

SUMMARY OF THE INVENTION

An object of the present invention is to avoid the disadvantages inherent in the prior art and to provide a method of and apparatus for detecting sounds due to the breakage of glass, which is simple and relatively inexpensive and can reliably discriminate between the sound of breaking glass and other sounds.

In accordance with the present invention, we propose a method of discriminating sounds due to the breakage of glass by converting the sounds into an electrical signal and analysing the signal, the method comprising detecting the occurrence of an initial sound, selecting only those initial sounds having components in a low frequency band and preferably exceeding a predetermined threshold level, establishing thereupon a delay followed by a time window, detecting the occurrence within the time window of a subsequent sound having frequency components in a high frequency band and generating an output signal if, and only if, the signals are detected in the required order and timing.

Also, in accordance with the invention, we propose apparatus for carrying out the above method comprising a transducer, a low frequency channel including a bandpass filter, a high frequency channel including a bandpass filter, first and second delay circuits, and an AND gate and alarm means, the transducer providing signals to the low frequency and high frequency channels, an output signal from the low frequency channel being applied to the first delay circuit, and the delayed output being applied to one input of the AND gate for a duration set by the second delay circuit, an output signal from a high frequency channel being applied to the second input of the AND gate, and the coincidence signal from the AND gate tripping the alarm means.

By virtue of excluding any initial sound the dominant frequency components of which fall outside the low frequency band and moreover, since the high and low bands are mutually exclusive, false alarms are far less likely to occur as compared with conventional detection systems.

Furthermore, the present inventors have discovered that the initial sound due to the breakage of glass has substantial (i.e. salient) frequency components at about 350 Hz and the subsequent sounds due to the falling pieces of glass have substantial frequency components at about 6.5 KHz. They have found that these frequencies are characteristic of breaking glass and are substantially independent of the other variable factors mentioned above such as size and thickness of glass, height and nature of mounting etc.

Therefore, according to the present invention although the low frequency band may extend up to about 800 or 900 Hz, it is preferably centred on a frequency of substantially 350 Hz.

A suitable value for the bandwidth of the higher frequency signal is 4 KHz to 10 KHz. In the preferred embodiment, the high frequency band is centred upon 6.5 KHz and has a bandwidth of ±2 KHz. The time window may suitably start at 200 milliseconds after the detection of the low frequency signal and continue for a further 800 milliseconds.

BRIEF DESCRIPTION OF THE DRAWINGS

The invention will now be described with reference to the accompanying drawings in which:

FIG. 1 is a waveform of a typical sound due to breaking glass;

FIGS. 2a and 2b are frequency spectrum analyses of portions of the waveform of FIG. 1;

FIG. 3 is a diagram illustrating the response of the system of the invention.

DESCRIPTION OF THE PREFERRED EMBODIMENT

FIG. 1 shows a waveform of a typical sound due to the breaking of a pane of glass. It comprises two major components, namely the transient sound generated when the pane of glass is struck (referred to herein as the "thump") followed after an interval by the sound due to the collision of the glass fragments with each other and with the surface upon which they fall (referred to herein as the "tinkle"), this being a sound of lower amplitude. The frequency spectra of these two components are respectively shown in FIGS. 2a and 2b.

The present invention turns on the discovery that the thump has strong frequency components in the neighbourhood of 350 Hz and the tinkle has substantial frequency components in the neighbourhood of 6.5 KHz.

These values being characteristic of breaking glass and substantially independent of the variable factors mentioned above. The invention makes use of these facts by detecting the occurrence of components at these frequencies in that order, and separated by a brief time interval.

FIG. 3 indicates schematically the response of a detection system according to the present invention. When a break occurs the low frequency components are detected and this initiates a short time delay, shown as A in the Figure. After this delay a time window is established, indicated at B in the Figure, during which the higher frequency of the tinkle components, if detected, is caused to produce a signal, for example, for setting off an alarm.

Figure 4A:
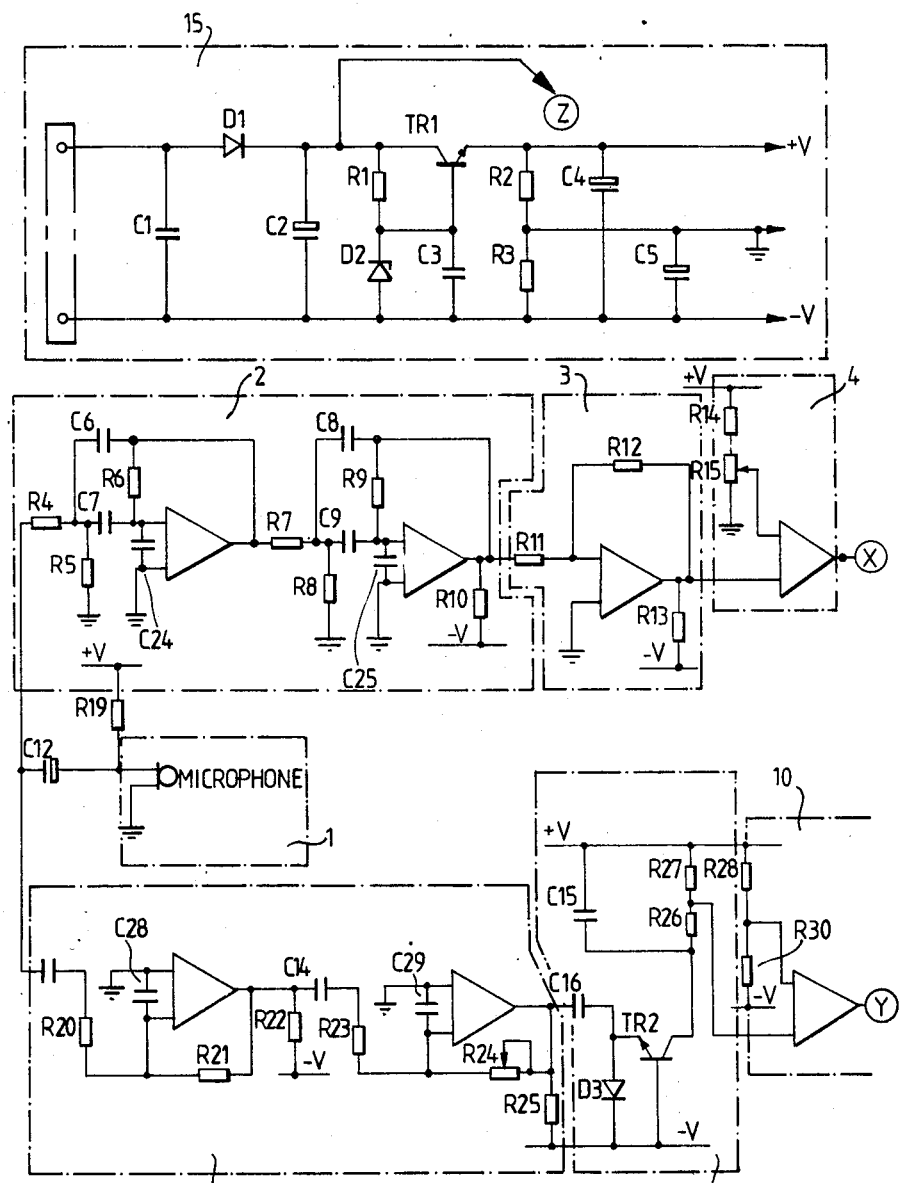
FIGS. 4A and 4B comprise a circuit diagram showing the essential components of apparatus according to the invention.
Figure 4B:
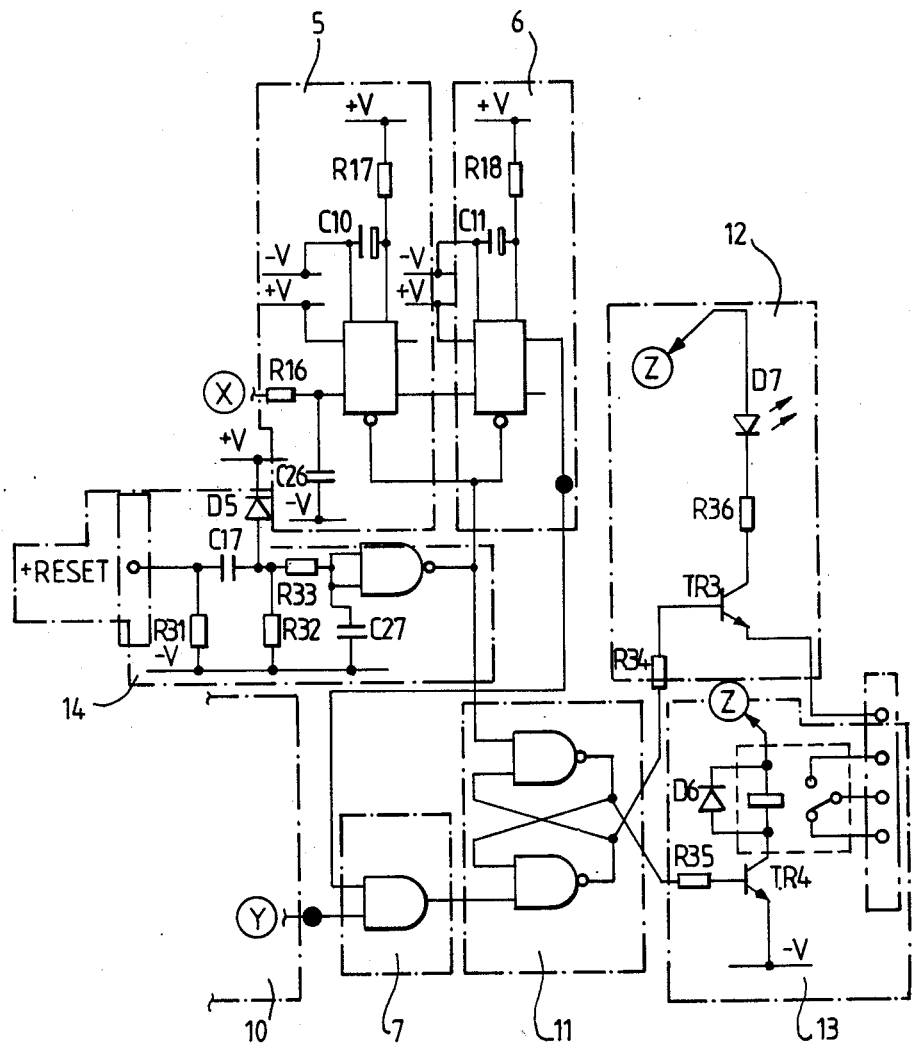

The circuit of FIG. 4 will be described in terms of functional blocks, the arrangement and connection of the individual components in each block being conventional.

A microphone 1 is positioned near the glass to be protected and its output is fed into two channels, a low frequency and a high frequency channel.

The low frequency channel comprises a low frequency bandpass filter 2 with a centre frequency of 350 Hz, followed by an amplifier 3 and a voltage comparator 4 which provides an output voltage when the amplitude of the signal from the bandpass filter and amplifier exceeds a threshold value determined by the setting of potentiometer R15.

The signal from the comparator 4 indicating that frequency components in the region of 350 Hz possibly representing the thump portion of a glass breakage signal have been detected is applied to a mono-stable 5 which, after a 200 millisecond delay triggers a timer 6. This timer produces a signal lasting for 800 milliseconds and this signal enables an AND gate 7.

The signal from the microphone 1 is also applied to a high frequency channel. This comprises a high frequency bandpass filter 8 having a pass band centred on 6.5 KHz and a bandwidth of ±2 KHz, followed by a frequency to voltage converter circuit 9, the output of which is applied to a one input of a voltage comparator 10. It will not allow any signal below 4.5 KHz to generate an output. It will be understood that the high frequency band pass filter 8 merely attenuates signals at frequencies outside the bandwidth and does not exclude them altogether. This is why the frequency to voltage converter is needed. It enables discrimination to be made between noises such as caused by tapping on the window, which contains dominant low frequency components in addition to high frequency components, and the tinkle in which the dominant frequencies are high frequencies above 4.5 KHz. This further reduces the risk of false alarms.

If the output of the converter 9 drops below a reference value applied to the other input of the comparator a signal is applied to other input of the AND gate 7. The reference value is set during manufacture and assembly of the detector, by means of the potential divider comprising R28 and R30. Further adjustment of the point at which the comparator 10 triggers (ie. the sound pressure threshold level) is available by varying the gain of the high band pass filter 8 and amplifier 9 circuits using variable resistor R24.

The AND gate 7 thus receives a signal at one input during a time window extending from 200 milliseconds to one second after a 350 Hz input signal possibly representing the thump of a glass breakage, has been received and a signal at its other input indicating detection of a signal having a component at 6.5 KHz. The coincidence of these two signals within the correct time frame produces an output from the AND gate 7 indicating that breakage has taken place.

The signal from the AND gate 7 is fed to a latch circuit 11 which operates an alarm indicator circuit 12 illuminating a light, and also to a relay circuit 13 arranged to give an audible or other warning.

A reset circuit 14 is provided to reset the latch 11 and the timer circuits, and this may be operated from the control circuit or from a remote push button.

The power for operating the circuit is provided by a power pack 15.

One advantage of detecting the sound of breaking glass in accordance with the present invention is that the need for time consuming tuning of the detector circuit on site, after installation, is avoided. Tests have shown that the threshold levels against which the signals are compared in comparators 4 and 10, equivalent to a low frequency sound pressure level of about 95 dB and a high frequency sound pressure level of about 75 dB give satisfactory results and these threshold levels can be set in the factory during manufacture and assembly.

We claim:

1. A method of discriminating sounds due to the breaking of glass by converting the sounds into an electrical signal and analysing the signal, the method comprising detecting the occurrence of an initial sound, selecting only those initial sounds having components in a low frequency band, establishing thereupon a delay followed by a time window, detecting the occurrence within the time window of a subsequent sound having frequency components in a high frequency band, and generating an output signal if, and only if, the signals are detected in the required order and timing.

2. A method according to claim 1 wherein the low frequency band is centred on a frequency of substantially 350 Hz.

3. A method according to claim 1 in which the high frequency band is from 4 KHz to 10 KHz.

4. A method according to claim 1 wherein the high frequency band is centred on a frequency of substantially 6.5 KHz.

5. A method according to claim 1 in which the delay preceding the start of the time window is substantially 200 milliseconds.

6. Apparatus for carrying out the method of claim 1 comprising a transducer (1), a low frequency channel including a bandpass filter (2), a high frequency channel (8) including a bandpass filter, first (5) and second (6) delay circuits, and an AND gate (7), and alarm means (12,13), the transducer (1) providing signals to the low frequency and high frequency channels, an output signal from the low frequency channel (2,3,4) being applied to the first delay circuit (5), and the delayed output being applied to one input of the AND gate (7), for a duration set by the second delay circuit (6), an output signal from a high frequency channel (8,9,10) being applied to the second input of the AND gate (7), and the coincidence signal from the AND gate tripping the alarm means (12,13).

7. Apparatus according to claim 6 wherein a frequency to voltage converter is connected to the band pass filter in the high frequency channel so as to exclude sounds containing both dominant high and low frequency components.

* * * * *

UNITED STATES PATENT AND TRADEMARK OFFICE
CERTIFICATE OF CORRECTION

PATENT NO. : 4,668,941

DATED : May 26, 1987

INVENTOR(S) : Raymond John Davenport, et al.

It is certified that error appears in the above-identified patent and that said Letters Patent is hereby corrected as shown below:

Please change the word "OR" in the title of the application to --OF--.

Signed and Sealed this

First Day of September, 1987

Attest:

DONALD J. QUIGG

Attesting Officer  Commissioner of Patents and Trademarks